United States Patent Office 3,597,260
Patented Aug. 3, 1971

3,597,260
PASSIVATION OF METALS
Marnell A. Segura, Baton Rouge, La., assignor to
Esso Research and Engineering Company
No Drawing. Filed Nov. 1, 1966, Ser. No. 591,124
Int. Cl. B44d 1/44; C23f 9/02; B32f 15/08
U.S. Cl. 117—62.2                                10 Claims

ABSTRACT OF THE DISCLOSURE

A process for passivating chemically active ferrous metals, especially powdered metals and porous, compacted forms of metals as resultant from direct iron ore reduction processes. The exterior surface of the metal, or metal substrate, is contacted with a liquid containing specific types of dimetallo substituted organo silane diols to form films. The films are then cured by reaction with moisture and carbon dioxide. The resinous material which is formed, of specified character, is impervious to moisture, corrosive gases, fumes and impurities.

---

This invention relates to the art of passivating metals, especially powdered metals and porous, compacted forms of metals. In particular, it relates to the art of forming protective films, surfaces, layers or coatings on ferrous meals.

The art is replete with disclosures of ways and means of protecting metallic surfaces. These include various chemical surface treatments, e.g., the blueing of iron. Disclosures also bear on applications, and the use, of applied films and surface coatings, e.g., paints, lacquers, resins, waxes, and the like. Surface barriers are formed which prevent penetration by the atmosphere, moisture and various corrosive gases, fumes or impurities.

The protection of porous, compacted forms of metals, briquettes, and powdered metals offer special problems dependent upon numerous factors. A major problem is that briquettes and powders offer very large surface areas thus greatly increasing the actual exposure. Certain metals are also very highly "active" and readily chemically react when exposed to various environments. To decrease the exposure area, to lessen the activity, and to improve handling characteristics generally, powdered metals per se are often admixed with various additives and binders and thence compacted. Sometimes, in addition, a surface coating is applied. Exposure of the inner portion of a so-formed mass is, at least to some extent, prevented. Among other disadvantages, however, impurities are often introduced into the metals which are very undesirable, and often intolerable. No mode of protection has been found entirely suitable, and particularly is this so in relation to the formation of certain forms of porous aggregates and powdered metals which are assuming an increasingly important role in today's technology.

In the field of powdered metallurgy, the techniques of producing, handling, and using finely divided metals or powders has always presented certain handling problems, and occasionally dangers, which have tended to suppress their full commercial utilization. There is, in particular, an increasing demand for methods of producing metals, especially iron, by direct reduction (reduction of ores without melting). The handling of the highly active metal powders, or the porous aggregates, from direct reduction processes, however, has presented problems which are especially acute, and militate against their widespread use. Such problems, if unsolved, would be indeed unfortunate in view of the increasing demand for, e.g., iron and steel, which is intensified due to the diminishing supply of iron ore reserves and the desire to utilize ore deposits which are generally unsuitable for conventional iron ore reduction processes. There is, then, an urgency to find suitable and more advanced techniques for protection of exposed metal surfaces, especially high surface area active metals.

In direct ore reduction processes, e.g., direct iron ore reduction processes, iron ore, in particulate form, is thus contacted with reducing gas at elevated temperatures for sufficient time to produce a particulate metallic iron product. Iron ores, which are reduced at temperatures below the softening point of iron, generally exhibit a tendency, even after cooling, to be pyrophoric, which is a tendency for the iron to rapidly, or instantaneously, reoxidize on exposure to air, often with violent reaction. On the other hand, reduced iron is subsequently treated to lessen pyrophoricity, or iron formed by reduction at temperatures above the softening point of iron may be less violently reactive but, nonetheless, there are some extremely difficult problems associated even with the handling and use of these products.

At a plant site, it is often essential that a reduced iron product, even after careful cooling, be stored, or shipped, in large quantities. There is, however, a tendency for a reduced iron product to back-oxidize, often relatively rapidly, especially where it must be stored, often for months, or shipped under relatively adverse conditions. This is so even where the iron powder is first aggregated into porous forms, as when compacted into the form of briquettes or extruded as rigid solid shapes. The tendency, however, is especially acute where it is desired to store or ship the reduced iron products as powders. Thus, e.g., even in the presence of atmospheric moisture, there is an acute tendency for the reduced iron product to back-oxidize, this to the chagrin of potential users who desire a highly metallic product. There is, however, an even more severe problem. Thus, where a reduced iron product, as briquettes or powder, has been placed in piles and stored for relatively short periods, intensely hot fires have resulted. Obviously, back-oxidation per se is bothersome enough, but spontaneous fires could be catastrophic under certain circumstances.

It is known that a porous or particulate reduced iron product, when dampened or wetted, as by atmospheric moisture, rain or spray, can liberate hydrogen. It is also known that oxygen, e.g., atmospheric oxygen, can produce back-oxidation of the metal. Hydrogen can, under certain circumstances, ignite spontaneously. Two reactions are believed primarily responsible for the oxidation, and spontaneous ignition, of a reduced iron product. A first reaction, which is only slightly exothermic, involves reaction between iron and water and can be represented by the equation:

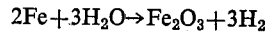

$$2Fe + 3H_2O \rightarrow Fe_2O_3 + 3H_2$$

The second reaction, which is highly exothermic, involves reaction between iron and oxygen and can be represented by the following equation:

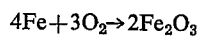

$$4Fe + 3O_2 \rightarrow 2Fe_2O_3$$

It is thought that fires may be caused from circumstances wherein the geometry of the stored or piled product is such that the heat generated by the reactions cannot be sufficiently rapidly dissipated. Eventually, the temperature from the hydrogen reaction builds up to a point where the air oxidation of iron becomes the controlling reaction. The latter reaction, being strongly exothermic, produces ignition of the hydrogen while the liberated heat sustains and increases the rate of the oxidation reaction. Under these conditions, the reactions can continue until essentially all of the metallic iron has been rapidly converted back to iron oxides.

The disadvantages and difficulties associated with handling and shipping such metal products are therefore apparent. The art is in dire need of effective ways and means of passivating metals, especially porous, compacted forms and powders of metals, particular ferrous metals such as those produced in direct iron ore reduction processes.

Accordingly, it is the primary objective of the present invention to supply this need. In particular, it is an object to obviate the foregoing and other disadvantages by providing a method for forming protective films or coatings on metallic surfaces, especially active metal surfaces of relatively large surface areas. A specific object is to provide a method for passivation of metals produced by direct reduction processes, especially direct iron ore reduction processes.

These and other objects are achieved by the present invention which contemplates passivating metals by forming surface films or coatings thereon to render the so-treated metals resistant to further change upon exposure to various environments which tend to produce oxidation. In accordance therewith, a liquid dispersion or solution of a silicone, or silicones, is applied to the surface of the metallic metal to form a film. Tho so-treated metal is then further processed, cured, or treated by reacting the film with moisture and carbon dioxide to form a water insoluble, water repellant surface film which acts as a barrier to prevent further penetration by the atmosphere, moisture and various corrosive gases, fumes or impurities.

Liquid solutions and dispersions suitable in accordance with the present invention are those liquids within which is dissolved or dispersed dimetallo substituted organo silane diols characterized by the formula:

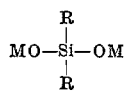

or, more accurately,

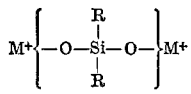

wherein: R is hydrogen or a monovalent organo radical, or hydrocarbyl radical, such as alkyl, aryl, aralkyl, alkaryl or the like, whether substituted or unsubstituted, and whether the R's of the $(R)_2Si(O^-)_2$ moiety are the same or different; and M is Group I or alkali metal of the Periodic Chart of the Elements.

Preferably, R is an alkyl containing from 1 to about 6 carbon atoms, e.g., methyl, ethyl, propyl, butyl, phenyl and the like, and M is lithium, sodium, potassium or the like.

These types of silicones can be formed by reaction between organo silane diols and alkali metal hydroxides, e.g., by reaction between dimethyl silane diol and sodium hydroxide. The reaction is generally carried out in solution. After application of a coating or thin layer of the dispersion or solution upon metal, the $R_2Si(OM)_2$ or $(CH_3)_2SiONa)_2$ can be cured by reacting with water and carbon dioxide to form a thin resinous or resin-like film or barrier which is highly impervious to gases, fumes, moisture or the like.

It is believed that the compounds of this invention react with water and carbon dioxide in similar manner to the reaction between silanols, which condense to form polysiloxane. Thus, in the presence of water, or in a water solution $(CH_3)_2Si(ONa)_2$ becomes ionized, as represented by the following:

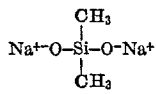

The individual molecules can react in accordance with the following:

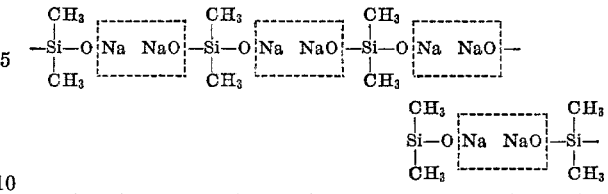

The liberated sodium oxide, $Na_2O$, reacts with carbon dioxide, $CO_2$, to form an aqueous solution of sodium carbonate, $Na_2CO_3$. The liberated $(CH_3)_2SiO=$ moieties link together to form polysiloxane, having more than three repeating units, as represented by the following formula:

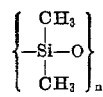

wherein: $n$ is an integer ranging generally from about 3 to about 20, or more preferably from about 5 to about 10.

To form these repeating units—viz $(CH_3)_2SiO=$, it is necessary that the silicone compound be difunctional in its reaction. Thus, it is essential that not less than two alkali metal atoms of the molecule be bonded, each through an oxygen atom, to silicon. A monofunctional molecule is not capable of propagating a sufficiently long polymeric chain. A greater number of functional groups produces cross-linking.

Exemplary of monomers suitable in accordance with the present invention are sodium methyl siliconate

lithium ethyl siliconate $(C_2H_5)_2Si(OLi)_2$, potassium n-isobutyl siliconate $(C_4H_9)_2Si(OK)_2$, sodium phenyl siliconate $(C_6H_5)_2Si(ONa)_2$, and the like.

A feature of this invention is that extremely thin films can be formed, but yet the films are highly effective barriers. It is thus known that most surface coatings to be effective, even for normal usages, must provide a continuous film several microns thick. In sharp contrast, however, the films formed according to this invention can be substantially monomolecular in thickness and yet highly effective. In fact, even where the film is somewhat discontinuous, it is yet quite effective and will prevent exposure of the metal surface. A significant advantage thereof is that the films can constitute only a minute amount—often less than 0.1 percent by weight—of extraneous material when used even on finely divided metal powders.

Solutions are generally formed by dissolving from one percent by weight of the monomer in water, up to the formation of a saturated solution. Generally, from one percent to about 5 percent of the monomer, or mixture of monomers, is dissolved in the water. Other liquids, e.g., organic and hydrocarbon solvents, are also suitable as vehicles for dissolving or dispersing the monomeric silicones for wetting, e.g., by spraying, dipping, immersing, of the metals to be passivated. Exemplary of these are benzene, toluene, xylene, trichloroethylene, perchloroethylene, carbon tetrachloride, chloroform, cyclohexane, ethylene dichloride, and the like. Preferably, the more common solvents such as kerosene, gasoline, and naphtha are employed because of their ready availability and relative cheapness.

The curing of the surface wetted metal, or film, is effected by reacting the film with carbon dioxide and air, in separate or simultaneous treating steps to produce a resin-like dry film. In fact, curing can be effected by subjecting the film to treatment with moist air, where moisture is not already present in the film, for a period ranging from 1 hour to about 24 hours, and more preferably from about 3 to about 10 hours. Treating temperatures range from ambient to about 200° F.

The treatment is applicable to bulk or particulate metal products, especially ferrous metal products. Reduced iron products from direct iron ore reduction processes, as powder or process aggregates, are especially susceptible to treatment in accordance with the present invention.

The passivated product is provided with a film ranging in thickness from about 20 A. (angstrom units) to about 10,000 A., and preferably in thickness ranging from about 20 A. to about 100 A. Such films constitute generally a very small fraction of a percent, based on the total weight of the treated metal.

This invention, its attributes and advantages, will be even better understood by reference to the following illustrative examples, demonstrations, and data.

In the demonstrations and examples of Examples I and II immediately following, raw natural hematite ore is charged to the top or initial stage of a reactor containing a series of four fluidized beds and progressively reduced, upon descent from one bed to the next of the series, by treatment with an ascending gaseous mixture of hydrogen and carbon monoxide at temperatures ranging from an initial 900° F. to 1500° F. in the final fluidized bed. The particulate reduced iron product is withdrawn from the final stage of the reactor and treated as subsequently described.

EXAMPLE I

Portions of the reduced iron powder are withdrawn from the reactor.

A first portion of the high metallization product is then immersed in a 3 weight percent aqueous solution of sodium methyl siliconate, and the wetted metal then withdrawn, spread on a tray, cured and dried at 200° F. in a circulating oven, in the presence of carbon dioxide, for several hours.

To determine the degree of passivity of the so-treated product, analyses are performed to measure the amount of oxygen consumed and hydrogen generated. The measurements are calculated on the basis standard cubic feet of oxygen consumed or hydrogen generated per hour per ton of reduced iron product. Analyses are also performed on an untreated portion of the product and comparisons of the results are made. In accordance therewith, it is found that relatively little oxygen is consumed or hydrogen liberated by the passivated metal. This, however, is in sharp contrast with similar tests conducted on the unpassivated product.

In fact, even after the passivated powder is fed into the nip of a double roll press and formed, at about 900° F., into pillow-shaped briquettes (3¾ x 1½ x 9/16 inches in size) having a density of 5.1, the briquettes show very low activity.

EXAMPLE II

In fact, when piles of the passivated and unpassivated briquettes are formed and subjected to storage conditions in the presence of moisture, the following results are obtained: Two pyramidal-shaped piles, eight feet high and fourteen feet in diameter at the base, are formed and covered with black polyethylene sheets. One pile is formed with passivated briquettes, and the other with unpassivated briquettes. The temperatures within the piles are observed by placing thermocouples in the piles at heights of 3 feet and 5 feet above the ground and toward the outer edge of the pile. As the temperature record shows, as set forth in the following table, there is little indication of a sudden temperature rise, at least initially:

| Time in hours after pile formation | Temperature, ° F. | |
|---|---|---|
| | Lower thermocouple | Upper thermocouple |
| 0 | 120 | 144 |
| 15¼ | 131 | 198 |
| 21¾ | 155 | 185 |
| 38½ | 180 | 190 |

After about 45 hours it is noticed in the untreated pile that the polyethylene toward the top of the pile, at a point away from the wind, begins to burn. Two hours later, temperatures of 600–700° F. are recorded on both thermocouples. However, briquettes at the outer bottom edge of the pile are quite cold, close to freezing, and the outer briquettes of the upper part of the pile are only warm to the touch. A blue flame is observed at the point where the plastic first burned. The fire is quickly extinguished by spreading the pile. Extremely high temperatures are observed in the center of the pile. The briquettes are glowing red in this area, about 1200–1400° F. The temperature is intense in the center of the pile and diminishes toward the edge of the pile.

In contrast, however, there is no indication of further temperature rise, or of burning, in the pile of treated briquettes.

The tremendous advantages achieved by the passivation technique are indeed apparent.

In the following, quantitative, comparative data are given for treated and untreated product. In analyzing for oxygen consumption and hydrogen evolution, the following procedure is employed:

To determine oxygen consumption, a rubber gas bag filled with pure oxygen is connected through a wet test meter and gas bubbler (to keep the oxygen saturated with water) to a sealed jar containing two wet briquettes. Prior to the test, the previously weighed dry briquettes are wet with an amount of water determined from the following porosity-water relationship:

| Briquette porosity, vol. percent: | Water added to briquettes, wt. percent on briquettes |
|---|---|
| 30 | 2.0 |
| 15 | 1.0 |
| 7 | 0.5 |

The entire system is flushed out with oxygen prior to connection of the gas bag (at least 1 revolution of the meter), and the wet test meter is set at zero at this time. When the bag has been connected, a timer is started and oxygen consumption is subsequently recorded at suitable time intervals, usually in terms of liters $O_2$/total elapsed time, minutes. The test is run at room temperature (75–78° F.). The test is started immediately after wetting sample.

The data recorded may be presented graphically or in terms of a calculated oxygen uptake per unit time, usually determined at several points over a 23-hour time period. The units chosen for expressing this latter quantity are cubic feet $O_2$/ton of iron/hour.

To measure hydrogen generation, weighed briquettes are submerged in a 500 cc. jar filled with water and permitted to stand until most of the air in the briquettes has ceased coming off. The jar is then sealed with a rubber stopper connected to a length of ⅛" O.D. metal capillary tubing. The end of the tubing is bent to extend up into an inverted burette (250 cc. capacity) filled with water. The apparatus is left to equilibrate for approximately 16 hours, after which time water is drawn back up into the burette to the bottom calibration mark. At this point, a timer is started and the volume of hydrogen generated is measured at suitable intervals by reading the water displacement directly from the burette.

EXAMPLE III

Reduced iron powder of 93 percent metalization is formed by reduction of a natural hematite at 1400° F. with a reducing gas mixture of carbon monoxide and hydrogen and is withdrawn from the final stage of the process and briquetted at 900° F. to yield an aggregated product of 14 percent porosity. The product is then formed into two portions. One portion is passivated at ambient temperature in a 3 percent solution of sodium methyl siliconate. The excess solution is drained from the briquettes and then cured by air drying for 24 hours.

The other portion is left untreated. Analysis shows the following comparative data for the two products:

|  | Oxygen consumption [1] | Hydrogen generation [2] |
|---|---|---|
| Treated product | 0.0 | 0.0 |
| Untreated product | 6.6 | 2.7 |

[1] Cubic ft./hour/ton of product.
[2] Cubic ft./hour/ton of product at 125° F.

These results are indeed significant, and the advantages are apparent.

EXAMPLE IV

When the foregoing example is repeated except that the treated briquettes are treated by quenching at 200° F. and then air dried, the oxygen consumption measures 0.42 and the hydrogen generation measures 0.41 standard cubic feet per hour per ton of product.

EXAMPLE V

When a five percent solution of sodium methyl silicone in Varsol is used for treatment of briquettes, as described in the foregoing example, and then air dried for 24 hours at room temperature, oxygen consumption and hydrogen generation in standard cubic feet per hour per ton of product is only 0.43 and 0.3, respectively.

EXAMPLE VI

Successful passivation is also obtained when the briquettes and powdered metal of reduced iron are treated with 3 percent aqueous solutions of lithium ethyl silicone and potassium phenyl silicone, respectively.

It will be understood that the specific method described, and the products produced, can be modified to some extent without departing from the spirit and scope of the present invention.

Having described the invention, what is claimed is:

1. A process for rendering a chemically active ferrous metal passive to back-oxidation and hydrogen generation by forming a film thereon which is impervious to moisture, corrosive gases, fumes and impurities comprising
   contacting and depositing upon the exterior surface of the metal a liquid containing a dimetallic substituted organo silane diol characterized by the formula:

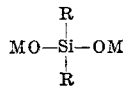

forming a film on the surface of the metal, and then curing the film by reacting the film with moisture and carbon dioxide to form a resinous material characterized by the following formula:

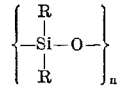

wherein:
R is selected from the hydrogen and monovalent hydrocarbon radicals, M is a Group I metal of the Periodic Chart of the Elements, and $n$ ranges from about 3 to about 20.

2. The process of claim 1 where M of the formula is selected from sodium, potassium, and lithium metals.
3. The process of claim 1 wherein the hydrocarbyl radical R contains from 1 to about 6 carbon atoms.
4. The process of claim 1 wherein the dimetallo substituted organo silane diol is sodium methyl silicone.
5. The process of claim 1 wherein $n$ of the formula ranges from about 5 to about 10.
6. The process of claim 1 wherein the metal upon which the film is formed is one resultant from a direct iron ore reduction process.
7. The process of claim 1 wherein the films which are formed range in thickness from about 20 A. to about 10,000 A.
8. The process of claim 7 wherein the thickness of the film ranges from about 20 A. to about 100 A.
9. The process of claim 1 wherein the reaction between carbon dioxide and moisture is effected at temperatures ranging from ambient up to about 200° F.
10. The process of claim 9 wherein the reaction is conducted for a period of time ranging up to about 24 hours.

References Cited

UNITED STATES PATENTS

| 2,507,200 | 5/1950 | Elliott | 117—139.5X |
| 2,587,636 | 3/1952 | Mac Mullen | 260—448.2 |
| 2,597,276 | 5/1952 | Altmann | 117—100X |
| 2,739,952 | 3/1956 | Linville | 117—161X |
| 2,744,040 | 5/1956 | Altmann | 117—100UX |
| 2,868,766 | 1/1959 | Johannson | 260—448.2X |
| 2,961,339 | 11/1960 | Wolff | 117—100X |
| 3,156,668 | 11/1964 | Pike | 260—448.2X |

OTHER REFERENCES

| 735,856 | 6/1966 | Canada | 117—100 |

WILLIAM D. MARTIN, Primary Examiner
H. J. GWINNELL, Assistant Examiner

U.S. Cl. X.R.
117—100, 132, 161